United States Patent
Liu

(10) Patent No.: US 12,277,078 B2
(45) Date of Patent: Apr. 15, 2025

(54) MULTI-CORE PROCESSING SYSTEM AND INTER-CORE COMMUNICATION METHOD THEREFOR, AND STORAGE MEDIUM

(71) Applicant: GREATER SHINE LIMITED, New Taipei (CN)

(72) Inventor: Jun Liu, Shanghai (CN)

(73) Assignee: GREATER SHINE LIMITED, New Taipei (CN)

( * ) Notice: Subject to any disclaimer, the term of this patent is extended or adjusted under 35 U.S.C. 154(b) by 78 days.

(21) Appl. No.: 18/135,877

(22) Filed: Apr. 18, 2023

(65) Prior Publication Data

US 2023/0259468 A1    Aug. 17, 2023

Related U.S. Application Data

(63) Continuation of application No. PCT/CN2021/121312, filed on Sep. 28, 2021.

(30) Foreign Application Priority Data

Nov. 9, 2020   (CN) .......................... 202011240281.X

(51) Int. Cl.
*G06F 13/28*   (2006.01)

(52) U.S. Cl.
CPC .......... *G06F 13/28* (2013.01); *G06F 2213/28* (2013.01)

(58) Field of Classification Search
CPC .................. G06F 13/28; G06F 2213/28; G06F 15/17331; G06F 15/167; G06F 9/544; G06F 9/546; G06F 9/54
See application file for complete search history.

(56) References Cited

U.S. PATENT DOCUMENTS

| | | | | |
|---|---|---|---|---|
| 5,485,594 A | * | 1/1996 | Foster | ................... G06F 15/167 |
| | | | | 711/155 |
| 8,244,930 B1 | * | 8/2012 | Dykema | ................. G06F 13/28 |
| | | | | 710/33 |

(Continued)

FOREIGN PATENT DOCUMENTS

| | | |
|---|---|---|
| CN | 1904873 A | 1/2007 |
| CN | 109491587 A | 3/2019 |

(Continued)

OTHER PUBLICATIONS

First Office Action from corresponding Chinese Application No. 202011240281.X, dated Jun. 10, 2023. English translation attached.

(Continued)

*Primary Examiner* — David E Martinez
(74) *Attorney, Agent, or Firm* — Sheppard, Mullin, Richter & Hampton LLP

(57) ABSTRACT

Provided are a multi-core processing system and an inter-core communication method therefor, and a storage medium. The method includes: reading from a shared memory a message written by a transmitting core, and parsing the message to obtain a source address of and a data length of data to be transmitted (S102); performing storage space allocation based on the data length to obtain a destination address of the data to be transmitted (S104); and transmitting the data to be transmitted from a storage space corresponding to the source address to a storage space corresponding to the destination address by means of Direct Memory Access (DMA), based on the source address, the data length, and the destination address (S106).

4 Claims, 6 Drawing Sheets

(56) References Cited

U.S. PATENT DOCUMENTS

| | | | |
|---|---|---|---|
| 8,635,412 | B1 | 1/2014 | Wilshire |
| 2008/0086617 | A1* | 4/2008 | Kasahara .............. G06F 15/167 |
| | | | 711/167 |
| 2009/0109968 | A1 | 4/2009 | Noy et al. |

FOREIGN PATENT DOCUMENTS

| | | |
|---|---|---|
| CN | 109976925 A | 7/2019 |
| CN | 110764924 A | 2/2020 |
| CN | 111107586 A | 5/2020 |
| CN | 111338998 A | 6/2020 |
| CN | 111427816 A | 7/2020 |
| CN | 112328533 A | 2/2021 |

OTHER PUBLICATIONS

International Search Report and Written Opinion dated Dec. 30, 2021 in International Application No. PCT/CN2021/121312. English translation attached.
Extended European Search Report dated Mar. 22, 2024 received in European Patent Application No. EP21888331.2.

* cited by examiner

Writing a message into a shared memory, so that a receiving core reads from the shared memory the message written by the transmitting core and parses the message to obtain a source address of and a data length of data to be transmitted, performs storage space allocation based on the data length to obtain a destination address of the data to be transmitted, and transmits the data to be transmitted from a storage space corresponding to the source address to a storage space corresponding to the destination address by means of DMA based on the source address, the data length, and the destination address ~S402

FIG.4

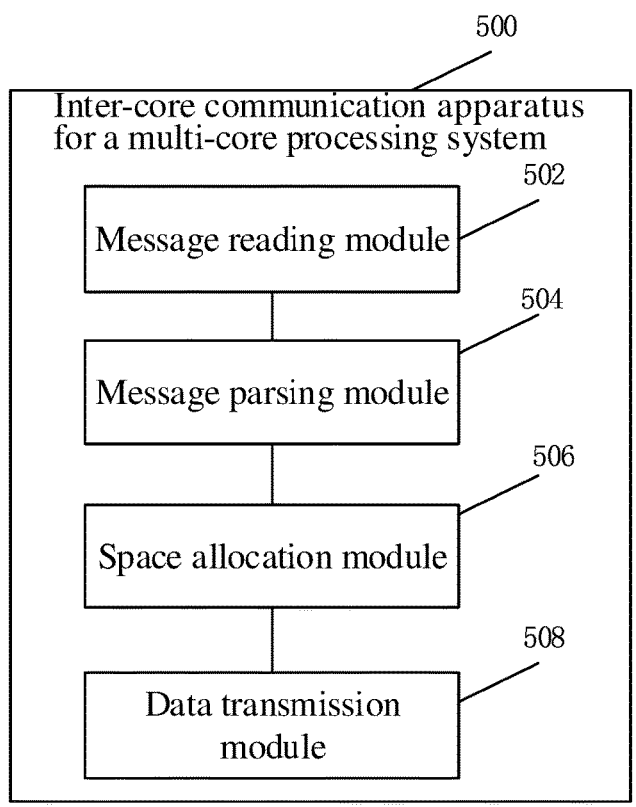

FIG.5

MULTI-CORE PROCESSING SYSTEM AND INTER-CORE COMMUNICATION METHOD THEREFOR, AND STORAGE MEDIUM

CROSS-REFERENCE TO RELATED APPLICATIONS

This application is a continuation of International Application No. PCT/CN2021/121312 filed on Sep. 28, 2021, which claims priority to Chinese Patent Application No. 202011240281.X filed on Nov. 9, 2020, and entitled "MULTI-CORE PROCESSING SYSTEM AND INTER-CORE COMMUNICATION METHOD THEREFOR, AND STORAGE MEDIUM", the entire contents of which are incorporated herein by reference.

FIELD

The present disclosure relates to the field of integrated circuit technologies, and in particular, to a multi-core processing system and an inter-core communication method therefor, and a storage medium.

BACKGROUND

With the integration of different types of Central Processing Units (CPUs) in a System On Chip (SOC), inter-core communication becomes more and more complex, and in particular, has increasingly higher performance requirements for transmission of a large amount of data. At present, a problem with the inter-core communication is large access delay of an application program.

SUMMARY

Based on this, it is necessary to provide, in consideration of the above technical problem, a multi-core processing system and an inter-core communication method therefor, and a storage medium.

In a first aspect, provided is an inter-core communication method for a multi-core processing system. The method is applied in a receiving core and includes: reading from a shared memory a message written by a transmitting core, and parsing the message to obtain a source address of and a data length of data to be transmitted; performing storage space allocation based on the data length to obtain a destination address of the data to be transmitted; and transmitting the data to be transmitted from a storage space corresponding to the source address to a storage space corresponding to the destination address by means of Direct Memory Access (DMA), based on the source address, the data length, and the destination address.

In a second aspect, provided is another inter-core communication method for a multi-core processing system. The method is applied in a transmitting core and includes: writing a message into a shared memory, such that a receiving core reads from the shared memory the message written by the transmitting core and parses the message to obtain a source address of and a data length of data to be transmitted, performs storage space allocation based on the data length to obtain a destination address of the data to be transmitted, and transmits the data to be transmitted from a storage space corresponding to the source address to a storage space corresponding to the destination address by means of DMA based on the source address, the data length, and the destination address.

In a third aspect, provided is a multi-core processing system, including: a transmitting core, a receiving core, a shared memory, and a DMA controller. The transmitting core is configured to write a message into the shared memory, the message including a source address of and a data length of data to be transmitted. The receiving core is configured to parse the message to obtain the source address of and the data length of the data to be transmitted, and configure the DMA controller based on the source address, the data length, and a destination address to transmit the data to be transmitted from a storage space corresponding to the source address to a storage space corresponding to the destination address by means of DMA. The destination address is determined by the receiving core.

BRIEF DESCRIPTION OF THE DRAWINGS

FIG. 4 is a schematic flowchart of an inter-core communication method for a multi-core processing system according to another embodiment.

FIG. 5 is a structural block diagram of an inter-core communication apparatus for a multi-core processing system according to an embodiment.

DETAILED DESCRIPTION

In order to make the objects, technical solutions, and advantages of the present disclosure more apparent, the present disclosure will be described in detail with reference to the accompanying drawings and embodiments. It should be understood that the embodiments described here are only used to explain, rather than limiting, the present disclosure.

Figure 1:
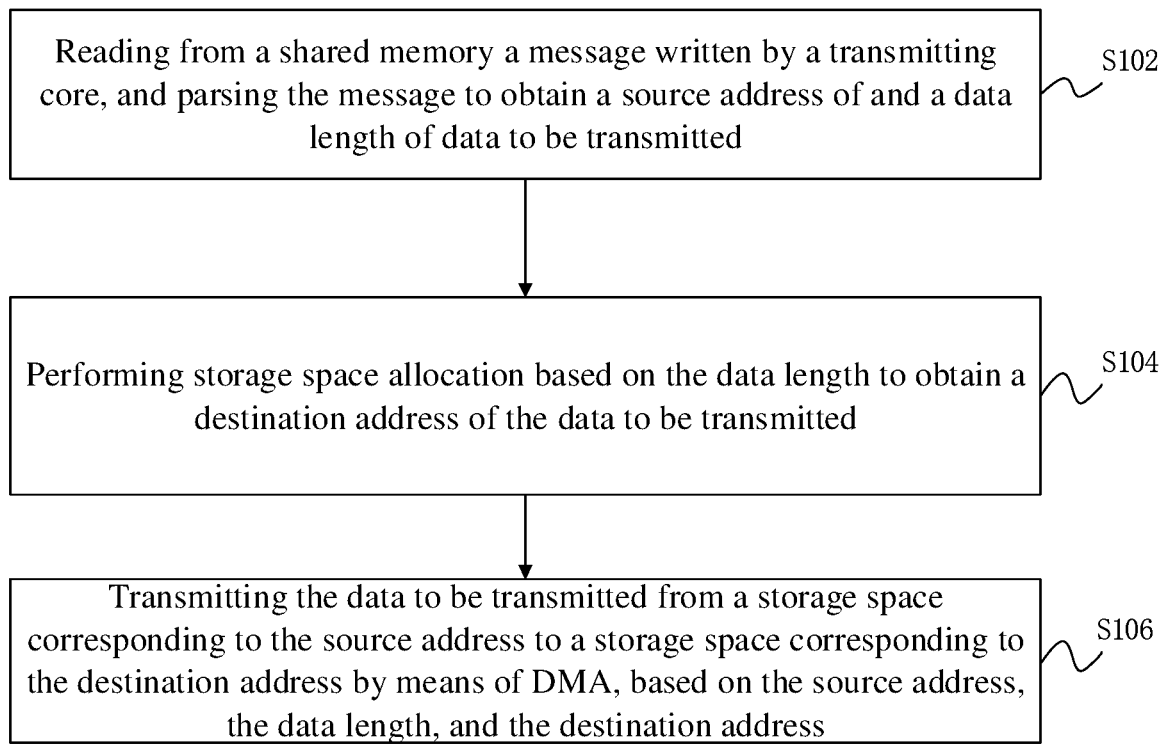
FIG. 1 is a schematic flowchart of an inter-core communication method for a multi-core processing system according to an embodiment.

In an embodiment, provided is an inter-core communication method for a multi-core processing system. The method is applied in a receiving core. Referring to FIG. 1, the inter-core communication method for the multi-core processing system includes actions at blocks S102 to S106.

At block S102, a message written by a transmitting core is read from a shared memory, and the message is parsed to obtain a source address of and a data length of data to be transmitted.

In the multi-core processing system, at least two processing cores (CPUs) are usually provided, and data sharing and synchronization sometimes are required to be performed between the two processing cores. Therefore, inter-core communication needs to be performed. For ease of description, in the present disclosure, a core for transmitting data is called a transmitting core, and a core for receiving the data is called a receiving core.

Figure 2:
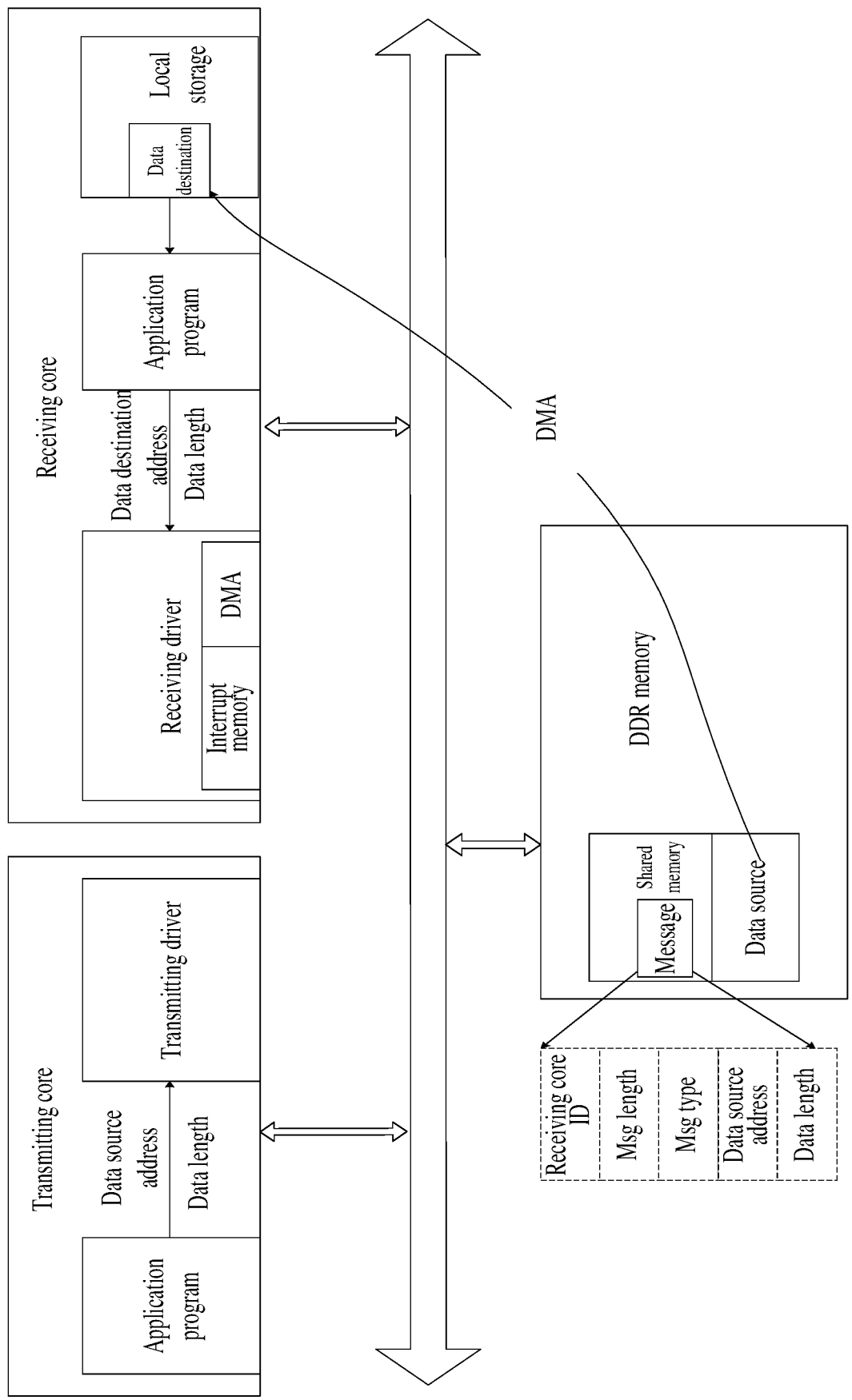
FIG. 2 is an architecture diagram of a multi-core processing system according to an embodiment.

As illustrated in FIG. 2, an application program of the transmitting core may generate certain data during operation, and part or all of the data needs to be transmitted to the receiving core to be processed by the receiving core. Therefore, the application program of the transmitting core writes the data that needs to be transmitted to the receiving core (i.e., the data to be transmitted) into a data region of the shared memory, and provides, to a transmitting driver of the transmitting core, a storage address of the data to be transmitted in the shared memory (i.e., the source address of the data), a data length thereof and the like.

After receiving the source address of and the data length of the data to be transmitted, the transmitting driver of the transmitting core transmits a shared memory connection establishment request to the receiving core. When the receiving core receives the request, a shared memory connection with the transmitting core is established based on the request. Otherwise, it indicates that a communication fault occurs therebetween. When the shared memory connection still cannot be established after a plurality of attempts, an alarm prompt is performed. After the shared memory connection is successfully established, the transmitting driver of the transmitting core encapsulates the source address of, the data length of, and the like of the data to be transmitted to generate the message, and writes the encapsulated message into a message region of the shared memory, which can avoid resource occupation caused by message packaging and the like before the shared memory connection is not successfully established. A format of the message can be: identification information (ID) of the receiving core, a length of the message, a type of the message (for example, the message is a control-type message, a communication-type message, or the like), and the source address of and the data length of the data to be transmitted. Then, the transmitting driver of the transmitting core generates an inter-core notification signal. For example, the transmitting driver of the transmitting core triggers an interrupt by writing into an interrupt register of the receiving core, so as to inform the receiving core that the data is ready.

After receiving the inter-core notification signal such as an interrupt signal, a receiving driver of the receiving core reads, in response to the inter-core notification signal, from the shared memory the message written by the transmitting core, parses the message to obtain the source address of and the data length of the data to be transmitted, and provides the source address of and the data length of the data to be transmitted to an application program of the receiving core.

In some embodiments, the shared memory is a storage space independent of the transmitting core, or a Random Access Memory (RAM) or Static Random Access Memory (SRAM) storage space in the transmitting core. That is, the shared memory can be an external one (as shown in FIG. 2) to reduce an occupied space of the message in the transmitting core, or can be a local storage like RAM or SRAM to further reduce a delay of message transmission.

At block S104, storage space allocation is performed based on the data length to obtain a destination address of the data to be transmitted.

After receiving the source address of and the data length of the data to be transmitted, the application program of the receiving core performs the local storage space allocation based on the data length, for example, divides a continuous storage space having a predetermined length from a local storage space for storage of the data to be transmitted. The predetermined length is greater than the data length of the data to be transmitted. In addition, the application program of the receiving core transmits an address of the storage space to the receiving driver of the receiving core as the destination address of the data to be transmitted.

In some embodiments, a storage space corresponding to the destination address is a storage space independent of the receiving core, or a RAM or SRAM storage space in the receiving core. That is, the local storage space can be an external one, or RAM or SRAM (as shown in FIG. 2). The former can be adopted to reduce an occupied space of the data to be transmitted in the receiving core, and the latter can be adopted to further reduce a delay in the access by the application program of the receiving core to the data to be transmitted.

At block S106, the data to be transmitted is transmitted from a storage space corresponding to the source address to a storage space corresponding to the destination address by means of Direct Memory Access (DMA), based on the source address, the data length, and the destination address.

After the receiving driver of the receiving core receives the destination address of the data to be transmitted, a DMA (Direct Memory Access) controller is configured based on the source address of, the data length of, and the destination address of the data to be transmitted, and then writes data to be transmitted corresponding to the source address from the shared memory into a local storage space of the receiving core. Then, the application program of the receiving core can directly read the required data to be transmitted from the local storage space, and process the data to be transmitted, etc., which can effectively reduce the access delay of the application program. After the DMA controller writes the data to be transmitted from the shared memory into the local storage space of the receiving core, a DMA read end signal is generated, and the receiving core clears the inter-core notification signal like the interrupt signal based on the signal, so that the transmitting driver of the transmitting core generates the next inter-core notification signal to transmit the next data.

In the above embodiments, an inter-core data transmission is performed in a manner of combining the shared memory and the DMA, which releases a CPU of the receiving core from the data transmission, thus improving efficiency of the CPU. Meanwhile, the data length of the data is transmitted to the receiving core through the message, so that the receiving core performs the local storage space allocation based on the data length, to store the data into the local storage space, which not only effectively reduces the access delay of the application program and avoids an access delay problem caused by the application program of the receiving core reading the data from the shared memory, but can also perform real-time distribution of the local storage space on the basis of actual situations and improve flexibility of data storage.

Figure 3:
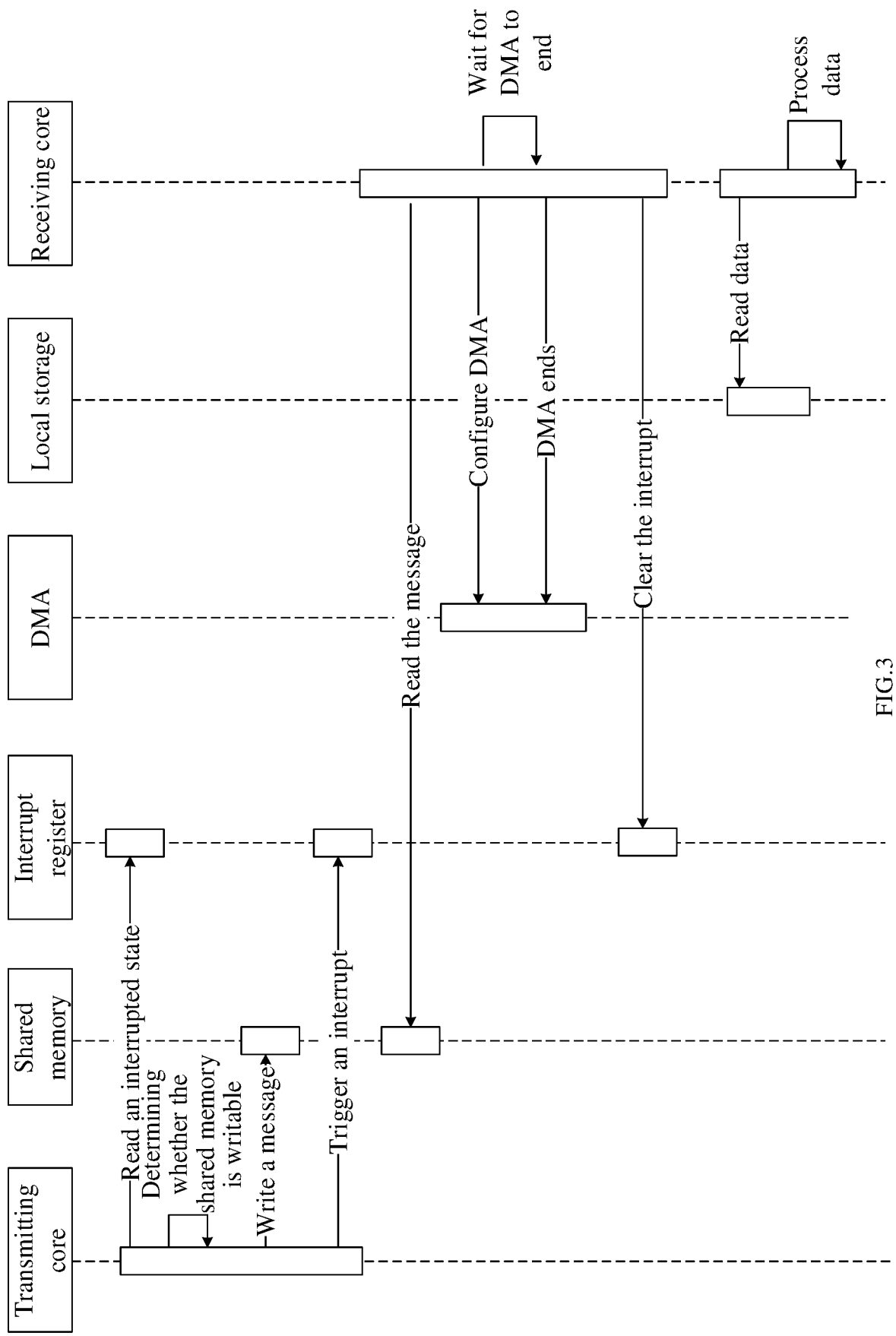
FIG. 3 is a schematic diagram of inter-core communication of a multi-core processing system according to an embodiment.

As a specific example, as illustrated in FIG. 3, the inter-core communication method for the multi-core processing system can include actions at blocks S302 to S322.

At block S302, the transmitting core reads a state of an interrupt register of the receiving core.

Specifically, the application program of the transmitting core generates a large amount of data to be transmitted during operation, stores the data to be transmitted to the data region of the shared memory, and provides the address of the data to be transmitted in the shared memory (i.e., the source address of the data) and the data length thereof to the transmitting driver of the transmitting core after the data to be transmitted is stored into the data region of the shared memory. Then, the transmitting driver of the transmitting core transmits the shared memory connection establishment request to the receiving core to establish a shared memory connection with the receiving core. After the shared memory connection is successfully established, the transmitting driver of the transmitting core reads the state of the interrupt register of the receiving core.

At block S304, the transmitting core judges whether the shared memory is writable.

The transmitting driver of the transmitting core can judge whether the shared memory is writable based on the read state of the interrupt register. When the shared memory is not writable, the judgement is repeatedly read. When the shared memory is writable, the next step is performed.

At block S306, the transmitting core writes a message into the shared memory.

When the shared memory is determined to be writable, the transmitting driver of the transmitting core encapsulates the source address of and the data length of the data to be transmitted as a message, and writes the message into the shared memory. The format of the message can be the ID of the receiving core, the length of the message, the ID of the message (that is used for indicating the type of the message), and the source address of and the data length of the data to be transmitted.

At block S308, the transmitting core triggers the interrupt signal.

The transmitting driver of the transmitting core triggers a shared memory interrupt by writing into the interrupt register of the receiving core, to inform the receiving core that the data is ready.

At block S310, the receiving core reads the message from the shared memory.

After receiving the shared memory interrupt, the receiving driver of the receiving core reads and parses the message in the shared memory to obtain the source address of and the data length of the data to be transmitted, and provides the source address and the data length to the application program of the receiving core. The application program of the receiving core allocates the local storage space according to the data length, and transmits an address of the allocated local storage space, to the receiving driver of the receiving core, as the destination address of the data to be transmitted.

At block S312, the receiving core configures the DMA controller.

After receiving the destination address of the data to be transmitted, the receiving driver of the receiving core configures the DMA controller on the basis of the source address of, the data length of, and the destination address of the data to be transmitted, to write the data to be transmitted from the shared memory into the local storage space through the DMA controller.

At block S314, it waits for the DMA to end.

The receiving driver of the receiving core waits for the end of the present data transmission.

At block S316, the DMA ends.

After the data transmission is completed, the DMA controller generates and transmits a DMA ending interrupt to the receiving driver of the receiving core, and the receiving driver of the receiving core receives the DMA ending interrupt.

At block S318, the receiving core clears the interrupt signal.

After receiving the DMA ending interrupt, the receiving driver of the receiving core informs the application program of the receiving core and clears the shared memory interrupt.

At block S320, the receiving core reads the data to be transmitted from the local storage space.

The application program of the receiving core directly reads the data to be transmitted from the local storage space.

At block S322, the receiving core processes the data to be transmitted.

The application program of the receiving core processes the read data to be transmitted.

In the embodiment, the inter-core data transmission is performed by combining the shared memory with the DMA, and the data transmission is performed by the DMA, which releases the CPU of the receiving core to improve the efficiency of the CPU. Meanwhile, the data length of the data is transmitted to the receiving core through the message, so that the receiving core performs the local storage space allocation based on the data length, to store the data into the local storage space, which can not only effectively reduce the delay in the access by the application program of the receiving core to the data to be transmitted and avoids the access delay problem caused by the application program of the receiving core reading the data from the shared memory, but can also perform the real-time distribution of the local storage space based on the actual situations and improve the flexibility of data storage. Meanwhile, whether the shared memory is writable is determined based on the state of the interrupt register, which can avoid data confusion caused by simultaneously performing data writing and data reading.

It should be noted that the above examples determine whether the shared memory is writable based on the state of the interrupt register, and writes the message into the shared memory when the shared memory is writable. This manner is mainly used for transmission of a small number of messages, in which case a small storage space is allocated for the message, for example, a storage space accommodating only one message. Therefore, it is required to write a message after reading a message to prevent message errors caused by performing the message writing while performing message reading. However, when transmission of a large amount of messages is carried out and this manner is still adopted, a problem of low message writing efficiency exists. In view of this, whether the shared memory is writable is judged according to the disclosure based on position information of a message read by the receiving core and position information of a message written by the transmitting core, to perform the message writing.

In some embodiments, the method further includes, after reading from the shared memory the message written by the transmitting core: recording second position information of a message currently being read from the shared memory, so that the transmitting core writes a message into the shared memory based on the second position information and first position information of a message currently being written into the shared memory.

Specifically, when transmission of a large amount of messages is performed, a larger storage space, for example, a storage space accommodating four messages and the like, can be allocated for the message in the shared memory. After the transmitting driver of the transmitting core writes a encapsulated message into the message region of the shared memory, position information of the message currently being written into the shared memory is recorded as the first position information, and an inter-core notification signal is generated. Then, the receiving driver of the receiving core reads the message from the shared memory according to the inter-core notification signal, records position information of its currently read message as the second position information, and transmits the second position information to the transmitting driver of the transmitting core. Then, the transmitting driver of the transmitting core judges whether a remaining storage space exists in the message region of the shared memory based on the first position information and the second position information. When the remaining storage space exists in the message region of the shared memory, the transmitting driver of the transmitting core writes the next message into the remaining storage space; and otherwise, the writing is paused.

In the embodiment, whether the shared memory is writable is judged on the basis of the position information of the message read by the receiving core and the position information of the message written by the transmitting core, to write the next message without waiting for the current shared memory interrupt to end, which effectively improves writing efficiency of the message, and is suitable for a multi-message transmission.

In an embodiment, an inter-core communication method for a multi-core processing system is provided. The method is applied in the transmitting core. Referring to FIG. 4, the inter-core communication method for the multi-core processing system can include actions at block S402.

At block S402, a message is written into a shared memory, so that a receiving core reads from the shared memory the message written by the transmitting core and parses the message to obtain a source address of and a data length of data to be transmitted, performs storage space allocation based on the data length to obtain a destination address of the data to be transmitted, and transmits the data to be transmitted from a storage space corresponding to the source address to a storage space corresponding to the destination address by means of DMA based on the source address, the data length, and the destination address.

Referring to FIG. 2, the application program of the transmitting core may generate certain data during operation, and part or all of the data needs to be transmitted to the receiving core to be processed by the receiving core. Therefore, the application program of the transmitting core writes the data that needs to be transmitted to the receiving core, i.e., the data to be transmitted, into the data region of the shared memory, and provides the storage address of the data to be transmitted in the shared memory (i.e., the source address of the data) and the data length thereof and the like to the transmitting driver of the transmitting core.

After receiving the source address of and the data length of the data to be transmitted, the transmitting driver of the transmitting core transmits the shared memory connection establishment request to the receiving core. When the receiving core receives the request, the shared memory connection with the transmitting core is established based on the request. Otherwise, it indicates that the communication fault occurs therebetween. When the shared memory connection still cannot be established after the plurality of attempts, the alarm prompt is performed. After the shared memory connection is successfully established, the transmitting driver of the transmitting core encapsulates the source address of, the data length of, and the like of the data to be transmitted to generate the message, and writes the encapsulated message into the message region of the shared memory, which can avoid the resource occupation caused by message packaging and the like before the shared memory connection is not successfully established. The format of the message can be: the ID of the receiving core, the length of the message, the type of the message (for example, the message is the control-type message, the communication-type message, or the like), and the source address of and the data length of the data to be transmitted.

In some embodiments, the shared memory is the storage space independent of the transmitting core, or the RAM or SRAM storage space in the transmitting core. That is, the shared memory can be an external one (as shown in FIG. 2) to reduce the occupied space of the message in the transmitting core, or can be the local storage manner like the RAM or SRAM to further reduce the delay of message transmission.

After writing the encapsulated message into the shared memory, the transmitting driver of the transmitting core generates an inter-core notification signal. For example, the transmitting driver of the transmitting core triggers the interrupt by writing into the interrupt register of the receiving core, so as to inform the receiving core that the data is ready. After receiving the inter-core notification signal such as the interrupt signal, the receiving driver of the receiving core reads, in response to the inter-core notification signal, from the shared memory the message written by the transmitting core, parses the message to obtain the source address of and the data length of the data to be transmitted, and provides the source address of and the data length of the data to be transmitted to the application program of the receiving core.

After receiving the source address of and the data length of the data to be transmitted, the application program of the receiving core performs the local storage space allocation based on the data length, for example, divides the continuous storage space having the predetermined length from the local storage space for the storage of the data to be transmitted. The predetermined length is greater than the data length of the data to be transmitted. In addition, the application program of the receiving core transmits the address of the storage space to the receiving driver of the receiving core as the destination address of the data to be transmitted.

After the receiving driver of the receiving core receives the destination address of the data to be transmitted, the DMA controller is configured based on the source address of, the data length of, and the destination address of the data to be transmitted, and then writes the data to be transmitted corresponding to the source address from the shared memory into the local storage space of the receiving core. Then, the application program of the receiving core can directly read the required data to be transmitted from the local storage space, and process the data to be transmitted, etc., which can effectively reduce the access delay of the application program. After the DMA controller writes the data to be transmitted from the shared memory into the local storage space of the receiving core, a DMA read end signal is generated, and the receiving core clears the inter-core notification signal like the interrupt signal based on the signal, so as for the transmitting driver of the transmitting core to generate the next inter-core notification signal to transmit the next data.

In some embodiments, the storage space corresponding to the destination address is the storage space independent of the receiving core, or the RAM or SRAM storage space in the receiving core. That is, the local storage space can be an external one, or the RAM or SRAM (as shown in FIG. 2). The former can be adopted to reduce the occupied space of the data to be transmitted in the receiving core, and the latter can be adopted to further reduce the delay in the access by the application program of the receiving core to the data to be transmitted.

In the embodiment, the inter-core data transmission is performed by combining the shared memory with the DMA, and the CPU of the receiving core is released from the data transmission, which improves the efficiency of the CPU.

Meanwhile, the data length of the data is transmitted to the receiving core through the message, so that the receiving core performs the local storage space allocation based on the data length, to store the data into the local storage space, which can not only effectively reduce the access delay of the application program and avoids the access delay problem caused by the application program of the receiving core reading the data from the shared memory, but can also perform the real-time distribution of the local storage space based on the actual situations and improve the flexibility of data storage.

In an embodiment, the method further includes, after writing the message into the shared memory: recording first position information of a message currently being written into the shared memory; obtaining second position information of a message currently being read from the shared memory; and writing a message into the shared memory based on the first position information and the second position information.

Specifically, when transmission of a large amount of messages is performed, a larger storage space, for example, the storage space accommodating four messages and the like, can be allocated for the message in the shared memory. After the transmitting driver of the transmitting core writes the encapsulated message into the message region of the shared memory, the position information of the message currently being written into the shared memory is recorded as the first position information, and an inter-core notification signal is generated. Then, the receiving driver of the receiving core reads the message from the shared memory based on the inter-core notification signal, records the position information of the currently read message as the second position information, and transmits the second position information to the transmitting driver of the transmitting core. Then, the transmitting driver of the transmitting core judges whether the remaining storage space exists in the message region of the shared memory based on the first position information and the second position information. When the remaining storage space exists in the message region of the shared memory, the transmitting driver of the transmitting core writes the next message into the remaining storage space; and otherwise, the writing is paused.

In the embodiment, whether the shared memory is writable is judged on the basis of the position information of the message read by the receiving core and the position information of the message written by the transmitting core, to write the next message without waiting for the current shared memory interrupt to end, which effectively improves the writing efficiency of the message, and is suitable for the multi-message transmission.

It should be understood that although steps in each of the flowcharts involved in FIG. 1 to FIG. 4 are illustrated in a sequence indicated by an arrow, these steps are not necessarily executed in the sequence indicated by the arrow. Unless explicitly stated herein, execution of these steps is not strictly limited to the sequence, and these steps may be performed in other sequences. In addition, at least a part of the steps in each of the flowcharts involved in FIG. 1 to FIG. 4 may include several sub-steps or several stages. These sub-steps or stages are not necessarily executed and completed at the same time, but may be executed at different times. These sub-steps or stages are also not necessarily executed sequentially one by one, but may be executed in turn or alternately with other steps, or sub-steps or stages of other steps.

In some embodiments, provided is a computer-readable storage medium, having a program for inter-core communication for a multi-core processing system stored thereon. The program, when executed by a processor, implements the inter-core communication method for the multi-core processing system that is applied in the receiving core or the transmitting core.

In some embodiments, an inter-core communication apparatus for a multi-core processing system is provided. The apparatus is applied in the receiving core. Referring to FIG. 5, the inter-core communication apparatus 500 for the multi-core processing system includes: a message reading module 502, a message parsing module 504, a space allocation module 506, and a data transmission module 508.

Here, the message reading module 502 is configured to read from the shared memory the message written by the transmitting core, the message including the source address of and the data length of data to be transmitted. The message parsing module 504 is configured to parse the message to obtain the source address of and the data length of the data to be transmitted. The space allocation module 506 is configured to perform storage space allocation based on the data length to obtain the destination address of the data to be transmitted. The data transmission module 508 is configured to transmit the data to be transmitted from the storage space corresponding to the source address to the storage space corresponding to the destination address by means of DMA, based on the source address, the data length, and the destination address.

In an embodiment, the message includes the identification information of the receiving core, the length of the message, and the type of the message.

In an embodiment, the storage space corresponding to the destination address is a storage space independent of the receiving core, or a RAM or SRAM storage space in the receiving core.

Figure 6:
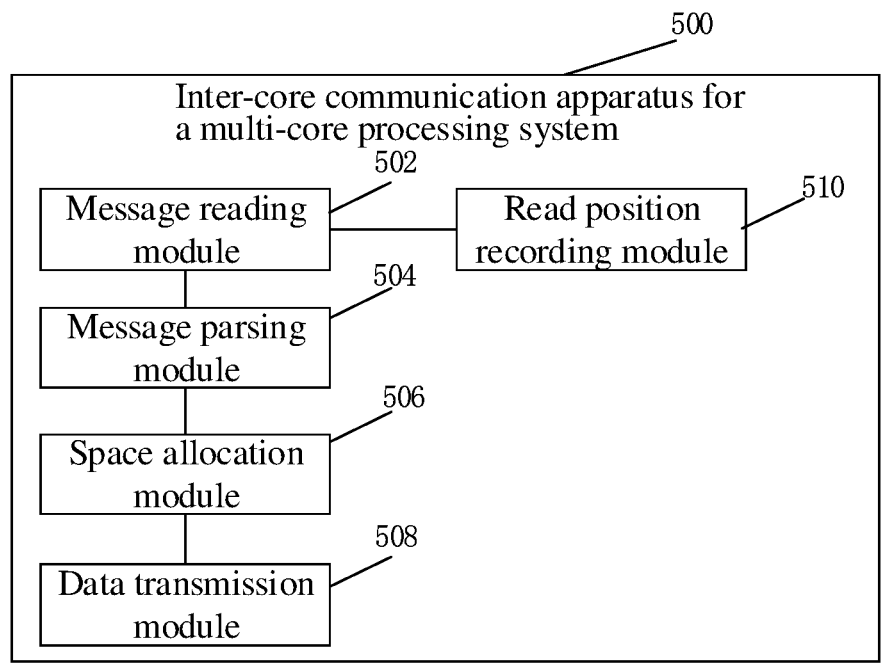
FIG. 6 is a structural block diagram of an inter-core communication apparatus for a multi-core processing system according to another embodiment.

In an embodiment, as illustrated in FIG. 6, the inter-core communication apparatus 500 for the multi-core processing system further includes a read position recording module 510, configured to record second position information of a message currently being read from the shared memory, so that the transmitting core writes a message into the shared memory based on the second position information and first position information of a message currently being written into the shared memory.

Figure 7:
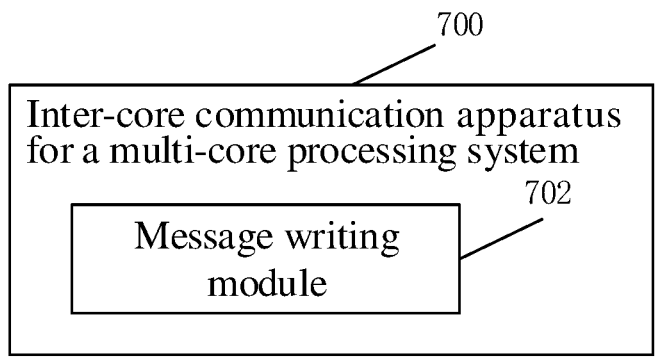
FIG. 7 is a structural block diagram of an inter-core communication apparatus for a multi-core processing system according to yet another embodiment.

In an embodiment, an inter-core communication apparatus for a multi-core processing system is provided. The apparatus is applied in the transmitting core. Referring to FIG. 7, the inter-core communication apparatus 700 for the multi-core processing system further include a message writing module 702.

Here, the message writing module 702 is configured to write a message into a shared memory, so that a receiving core reads from the shared memory the message written by the transmitting core and parses the message to obtain a source address of and a data length of data to be transmitted, performs storage space allocation based on the data length to obtain a destination address of the data to be transmitted, and transmits the data to be transmitted from a storage space corresponding to the source address to a storage space corresponding to the destination address by means of DMA based on the source address, the data length, and the destination address.

In an embodiment, the message includes identification information of the receiving core, a length of the message, a type of the message, and the source address of and the data length of the data to be transmitted.

In an embodiment, the shared memory is a storage space independent of the transmitting core, or a RAM or SRAM storage space in the transmitting core.

Figure 8:
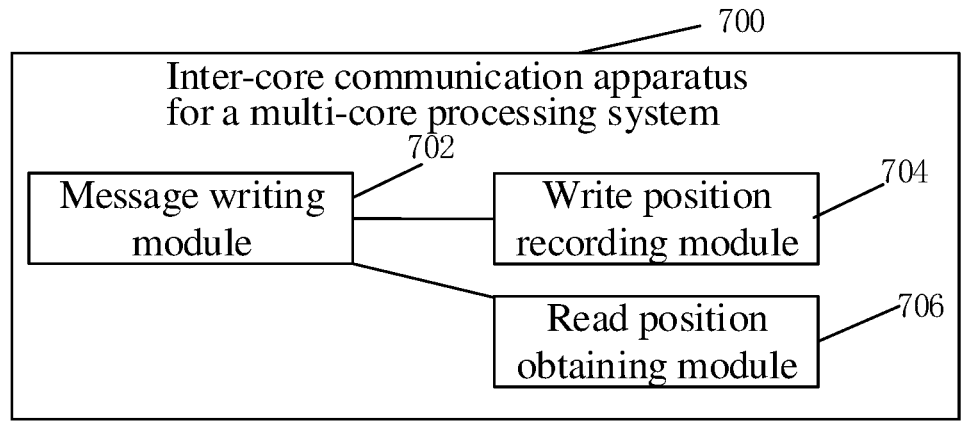
FIG. 8 is a structural block diagram of an inter-core communication apparatus for a multi-core processing system according to still yet another embodiment.

In an embodiment, as illustrated in FIG. 8, the inter-core communication apparatus 500 for the multi-core processing system further includes: a write position recording module 704 and a read position obtaining module 706. The write position recording module 704 is configured to record first position information of a message currently being written into the shared memory. The read position obtaining module 706 is configured to obtain second position information of a message currently being read from the shared memory. The message writing module 702 is further configured to write a message into the shared memory based on the first position information and the second position information.

For specific limitations on the inter-core communication apparatus for the multi-core processing system, reference may be made to limitations on the inter-core communication method for the multi-core processing system, which will not be repeated here. Each module in the inter-core communication apparatus for the multi-core processing system may be implemented in whole or in part by software, hardware, and a combination thereof. The above modules can be embedded in or independent of the processor in the computer device in the form of hardware, or stored in the memory in the computer device in the form of software, such that the processor can invoke and execute operations corresponding to the above modules.

Figure 9:
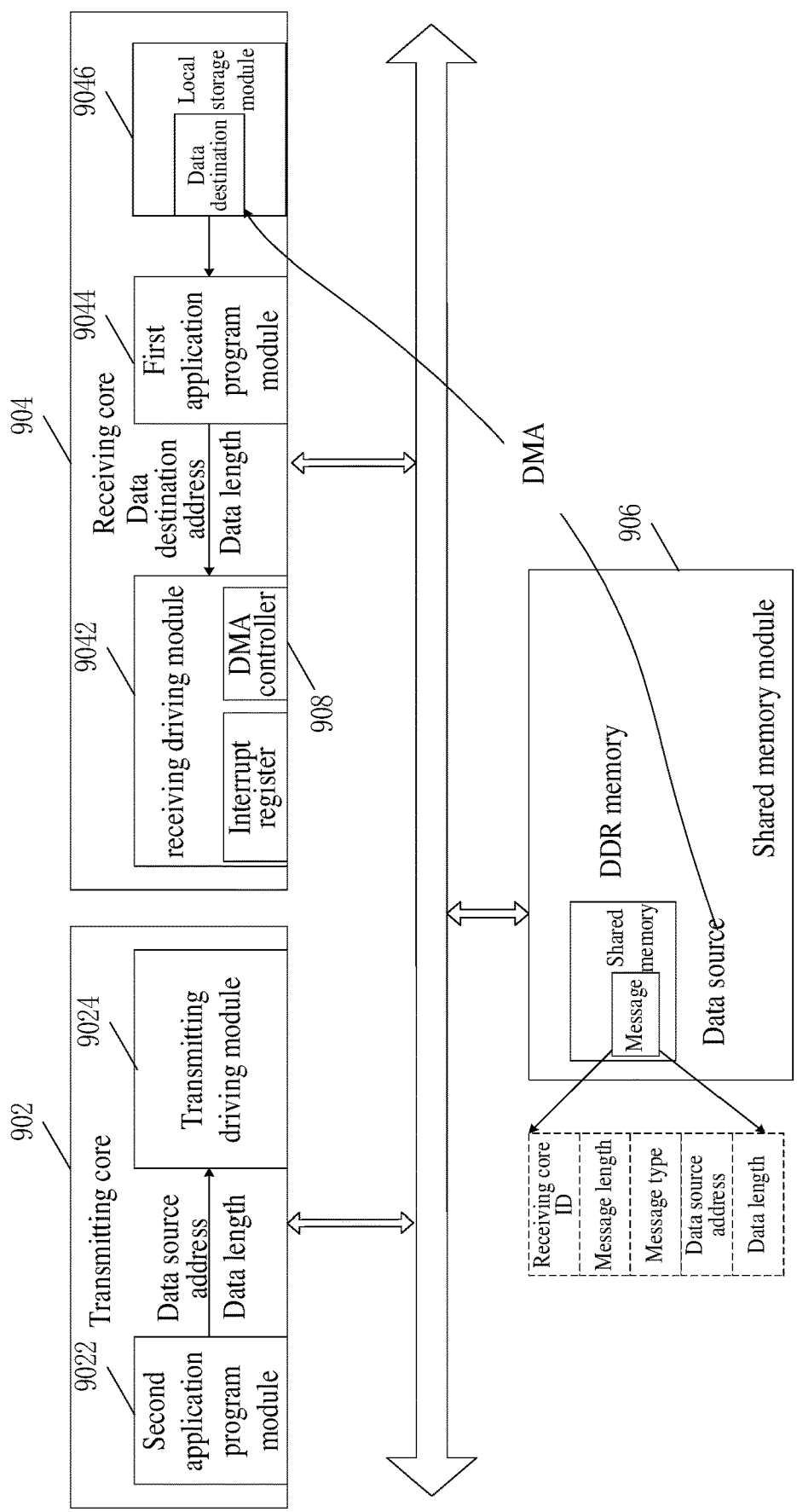
FIG. 9 is a structural block diagram of a multi-core processing system according to an embodiment.

In an embodiment, as illustrated in FIG. 9, a multi-core processing system is provided, including: a transmitting core 902, a receiving core 904, a shared memory 906, and a DMA controller 908.

Here, the transmitting core 902 is configured to write a message into the shared memory 906, the message including a source address of and a data length of data to be transmitted. The receiving core 904 is configured to parse the message to obtain the source address of and the data length of the data to be transmitted, and configure the DMA controller 908 based on the source address, the data length, and a destination address to transmit the data to be transmitted from a storage space corresponding to the source address to a storage space corresponding to the destination address by means of DMA. The destination address is determined by the receiving core 904.

In an embodiment, the message further includes: identification information of the receiving core, a length of the message, and a type of the message.

In an embodiment, the receiving core 904 includes: a receiving driver 9042, a first application program 9044, and a local storage 9046. The receiving driver 9042 is configured to parse the message to obtain the source address of and the data length of the data to be transmitted. The first application program 9044 is configured to perform storage space allocation on the local storage 9046 based on the data length to obtain the destination address. The receiving driver 9042 is further configured to configure the DMA controller 908 based on the source address, the data length, and the destination address.

In an embodiment, the DMA controller 908 is provided in the receiving driver 9042.

In an embodiment, the transmitting core 902 includes: a second application program 9022 configured to obtain the source address of and the data length of the data to be transmitted; and a transmitting driver 9024 configured to encapsulate the source address of and the data length of the data to be transmitted to obtain the message, and write the message into the shared memory 906.

In an embodiment, the local storage 9046 is a storage space independent of the receiving core, or a RAM or SRAM storage space in the receiving core.

In an embodiment, the shared memory 906 is a storage space independent of the transmitting core, or a RAM or SRAM storage space in the transmitting core.

In an embodiment, the transmitting core 902 is further configured to record first position information of a message currently being written into the shared memory 906. The receiving core is 904 further configured to record second position information of a message currently being read from the shared memory 906. The transmitting core 902 is further configured to write a message into the shared memory 906 based on the first position information and the second position information.

For specific limitations on the multi-core processing system, reference may be made to limitations on the inter-core communication method for the multi-core processing system, which will not be repeated here. Each module in the multi-core processing system may be implemented in whole or in part by software, hardware, and a combination thereof. The above modules can be embedded in or independent of the processor in the computer device in the form of hardware, or stored in the memory in the computer device in the form of software, such that the processor can invoke and execute operations corresponding to the above modules.

Those skilled in the art can understand that all or part of the steps of the method according to any of the above embodiments can be implemented by relevant hardware instructed by a computer program. The computer program can be stored in a non-volatile computer-readable storage medium. The computer program, when executed, may include the steps of the method according to any of the above embodiments. Here, any reference to a memory, a storage, a database, or other media as used in the embodiments provided by the present disclosure may include a non-volatile and/or a volatile memory. The non-volatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache memory. By way of illustration, rather than limitation, an RAM is available in various forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The technical features of the above embodiments can be combined arbitrarily. In order to keep the description concise, not every possible combination of the technical features in the above embodiments is described. However, as long as there is no conflict for the combination of the technical features, any combination of the technical features should be considered as falling in the scope of this specification.

The above embodiments illustrate merely some implementations of the present disclosure. Although description of the above embodiments is specific and detailed, the description should not be construed as limitations on the scope of the embodiments of the present disclosure. It should be pointed out that, various modifications and improvements can be made by those skilled in the art without departing from the concept of the embodiments of the present disclosure, and shall fall within the protection scope of the embodiments of the present disclosure as defined by the claims as attached.

What is claimed is:

1. An inter-core communication method for a multi-core processing system, the method being applied in a receiving core and comprising:

reading from a shared memory a message written by a transmitting core, and parsing the message to obtain a source address of and a data length of data to be transmitted;

performing storage space allocation based on the data length to obtain a destination address of the data to be transmitted; and transmitting the data to be transmitted from a storage space corresponding to the source address to a storage space corresponding to the destination address by means of Direct Memory Access (DMA), based on the source address, the data length, and the destination address;

wherein the method further comprising:

subsequent to reading from the shared memory the message written by the transmitting core:

recording second position information of a message currently being read from the shared memory, such that the transmitting core writes a message into the shared memory based on the second position information and first position information of a message currently being written into the shared memory.

2. The inter-core communication method for the multi-core processing system according to claim 1, wherein the message comprises identification information of the receiving core, a length of the message, a type of the message, and the source address of and the data length of the data to be transmitted.

3. The inter-core communication method for the multi-core processing system according to claim 1, wherein the storage space corresponding to the destination address is a storage space independent of the receiving core, or a Random Access Memory (RAM) or Static Random Access Memory (SRAM) storage space in the receiving core.

4. A computer-readable storage medium, having a program for inter-core communication for a multi-core processing system stored thereon, wherein the program, when executed by a processor, implements the inter-core communication method for the multi-core processing system according to claim 1.

* * * * *